Patented Dec. 26, 1944

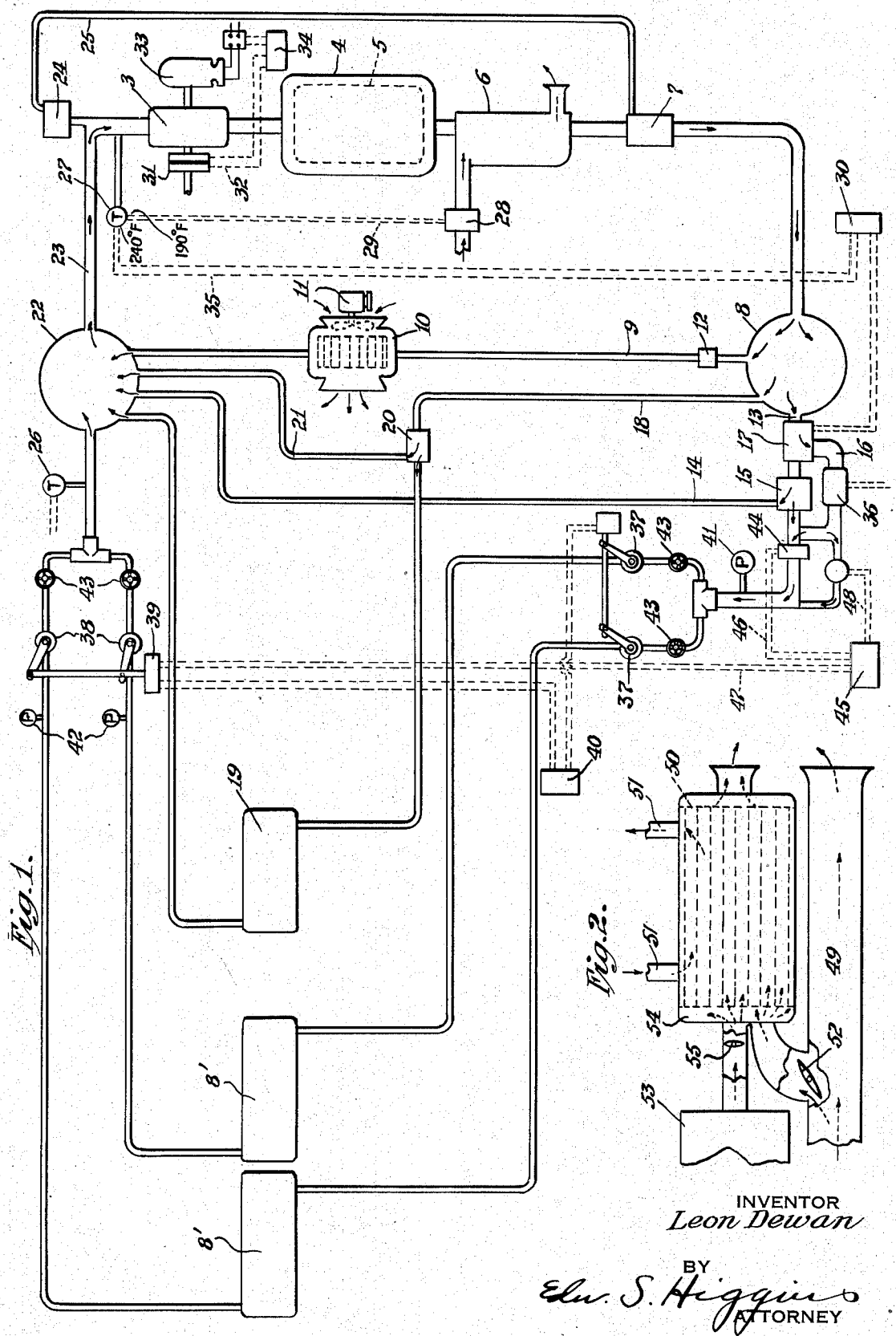

2,366,089

UNITED STATES PATENT OFFICE 2,366,089

ANTI-ICING AND ENGINE COOLING SYSTEM FOR AIRPLANES

Leon Dewan, Arverne, N. Y.

Application March 20, 1943, Serial No. 479,838

12 Claims. (Cl. 244—134)

My invention relates to a combined system for preventing icing and for cooling the engines of airplanes such as disclosed in my copending application Serial Number 466,122, filed November 19, 1942.

One object of my invention is to keep the circulating coolant of such a system within a constant temperature range regardless of atmospheric temperature change and at the same time to provide ample heat for preventing icing when it is needed.

Another object is to provide a unified system wherein the heat for the cabin is derived from the same source as the heat for preventing icing.

Another object is to provide means whereby in case of engine failure the anti-icing system will be maintained and the engine kept warm to make re-starting easy or possible.

Other objects and advantages of my improved system will be apparent from the description thereof to follow.

According to the invention, special thin radiators line the leading edges of the wings and other anti-icing parts of the plane, one side of the radiators forming the outer surface of the plane and being of a porous metal such as sintered aluminum so that some of the anti-freeze liquid coolant may be exuded therefrom when necessary. The combined heat and properties of the anti-freeze at the wing surface form the anti-icing means, and this liquid minus the heat thus dissipated and lost becomes and efficient coolant upon return to the engine.

Ordinarily the radiators are by-passed thermostatically according to the coolant temperature, the radiators receiving less flow with lowering temperature. In this invention, however, when icing conditions occur, the by-pass is bridged so that the radiators receive a fuller flow of liquid which is controlled by an icing indicator according to the severity of the icing conditions, or by a thermo element to increase the flow through the radiators with lowered temperature of the liquid.

The coolant passes through a special heater between the engine and the radiators, this heater operating only when the liquid falls below a predetermined temperature. This operating point is raised when icing conditions occur. The heater may be of the combustion or exhaust gas exchange type or a combination of the two.

The coolant pump is turned by the engine through a magnetic clutch which can be released when the engine fails so that the pump may be driven by an electric motor. At the same time the combustion heater is automatically brought into play by the lowered temperature of the liquid so that the heated circulating fluid serves to maintain anti-icing conditions and to keep the motor warm to facilitate restarting. The electric motor may serve as a generator under ordinary conditions for adding to the storage battery charge and the same emergency system may be used on the ground to warm up the engine and coolant before starting under low temperature conditions.

A part of the liquid issuing from the heater outlet is led to an air-liquid heat exchange which is used to heat air for the cabin and cockpit, the flow in this branch being controlled in accordance with cabin temperature.

Fig. 1 is a schematic illustration of my improved system and its operation.

Fig. 2 is a view in side elevation of one form the improved special heater may take.

Referring to the drawing, in Fig. 1, a pump 3 circulates an anti-freeze liquid such as ethylene glycol for example through the cooling jacket as represented at 4 of an airplane engine 5, and through a heater 6 whose function is to maintain or raise the temperature of the liquid when necessary. The liquid passes through a centrifuge 7 which extracts any gases therefrom and on to a header tank 8 from which it is distributed to the various points. One branch 9 passes through the air-liquid exchanger 10 which is provided with a fan 11 for circulating heated air for the cabin. The thermostat 12 in this branch regulates the flow according to cabin temperature to keep it constant.

Branch 13 leads to the anti-icing radiators and is by-passed by the pipe 14 leading to the return line. The by-pass thermostat valve 15 controls the relative flow so as to decrease the same through the radiators in proportion to lowered temperature of the liquid. This valve is bridged by the pipe 16 whose entrance is controlled by a solenoid operated valve 17.

Branch 18 leads to an auxiliary radiator 19 whose surface may be of solid aluminum and which may form a part of the surface of the plane which does not particularly require anti-icing measures. The thermostat 20 controlling the by-pass 21 for this radiator also reduces the flow through the radiator in proportion to lowered liquid temperature but closes completely at a comparatively high temperature, this radiator being in use only in a hot climate or where the anti-icing radiator is completely disabled.

The returning liquid mingles in the tank 22 and passes through main pipe 23 at the topmost part in which is located the reservoir and expansion tank 24 which replenishes any liquid lost through exudation and other causes and allows for thermal expansion of the liquid. This is supplied from a branch 25 from the centrifuge 7 in the usual manner.

The thermometer 26 indicates the temperature of the liquid as it comes from the anti-icing radiator and may be used to control the valve 36 in some cases under icing conditions to regulate the temperature in the radiator line. This is indicated by the short dotted lines issuing from members 26 and 36.

The thermo-control 27 in the main line controls the heater 6 by turning the control 28 on and off within predetermined temperature limits by electric apparatus through control lines 29 indicated by dotted lines. The control apparatus for this purpose is well known and needs no detailed description. The temperature limits at which the heater is operated may be changed by suitable switching to a different set of contacts on the thermo control 27 and this may be controlled by a central switching apparatus 30 for setting anti-icing measures into motion. The same apparatus is used to operate valve 17 and open the flow through the radiators as indicated by the dotted control lines.

The coolant pump 3 is turned by engine coupling through electro-magnetic clutch 31 which can be released at will through control line 32 to disengage the pump from the engine. The generator 33 coupled to the pump shaft would then be converted into an electric motor powered by the storage batteries and come into play for operating the pump. Ordinarily the generator supplies current for a purpose that would not be greatly effected in case of engine failure. For example, it may assist in charging the storage batteries during flight.

The switch apparatus 34 controls the release of magnetic clutch 31 and also effects whatever circuit changes are necessary to convert the generator into a motor in connection with the nature of its use.

The operation of the system is as follows: under normal flying conditions where the outside temperature is high, the anti-icing radiators would receive the full flow of liquid through valve 15 and the auxiliary radiator would receive a flow depending on the outside temperature plus engine conditions. Heater 6 would be inoperative. As the outside temperature lowers, the valve 20 of the auxiliary radiator 19 closes completely at a comparatively high point and the valve 15 of the anti-icing radiators would reduce the flow through same in accordance with the falling temperature, though never completely closing as some little flow must remain to keep the liquid in the radiators from congealing when the temperature is extremely low. The liquid then would be almost completely by-passed through pipes 14 and 21 and would maintain its temperature for the cabin heating through pipe 9 and for the normal engine operation. If however the outside temperature still descends, the lowering of the liquid temperature below a predetermined point, say 190° F., will cause the thermo control 27 to operate the heater to maintain normal temperature, the heater either being varied gradually to balance the temperature or merely discontinued when the temperature arises above another predetermined point, say 250° F.

When icing conditions occur, the solenoid valve 17 is actuated through the anti-icing control center 30 to open the flow to the radiators through pipe 16 bridging the by-pass thermo-valve 15. The temperature of the liquid in the main line would tend to descend due to this flow except that the thermostat 27 automatically operates the heater at a predetermined point to maintain the temperature normal so that the radiators now receive a full flow of liquid at a comparatively high temperature. To increase the anti-icing effect under severe icing conditions, the temperature limit on the thermostat 27 may be raised as described by actuation through control line 35 and the heater operated at a higher level. The flow through pipe 16 may be regulated in accordance with the temperature of the radiator return liquid as measured by thermo device 26, by suitable control therefrom to the valve 36, as shown by the partially extended dotted lines, or it may be varied in accordance with severity of icing conditions in conjunction with an icing indicator. The degrees of temperature mentioned are given only for the purpose of illustration and may vary in accordance with the type of operation.

As previously described, the coolant pump 3 turns the generator 33 ordinarily to help charge the storage batteries, while at any time the switching apparatus 34 may be actuated and the magnetic clutch 31 released to cause generator 33 to act as a motor and keep the pump and coolant in operation. This is most necessary in case of engine failure. The heater is automatically brought into operation at the same time by the lowered liquid temperature. It is necessary however to prevent operation of the heater in case both the engine and the electric motor fail for any reason in which case a centrifugally operated switch turned by the pump shaft may keep the heater control circuit intact only while the pump shaft is turning. This combination of electrically driven pump and combustion heater may be operated before the engine is started on the ground in cold weather to warm the engine and coolant quickly and satisfactorily, particularly for emergency starts in cold climates.

The system for creating occasional pressure in the radiators to cause exudation of anti-freeze and the leak test with automatic shut-off of leaking radiator units, while fundamentally similar to that described in my copending application, Serial Number 466,122, differs in design. The leak test is as follows: the gang operated valves 37 and 38 normally allow full flow of the coolant. However at suitable intervals both sets of valves are operated momentarily and caused to constrict the flow by means of solenoid apparatus 39 through central switch 40 to such an extent as to cause the pressure indicating and control system as represented by the pressure meter 41 and the pressure meters 42 to be sensitive to any fall of pressure in a unit radiator due to a leak. The test may be carried out periodically through automatic means operating control 45 at regular intervals. Well known remote indication system may transmit to the cockpit the movements of meters 41 and 42 located near the engine and cooling system. If the pressure in one unit radiator as shown by its meters 42 compared to meter 41 is below that of the rest, a warning may be operated and its valves 43 are automatically shut as described in detail in my copending application, Serial Number 466,122.

When icing conditions occur and it is desired to cause an exudation of anti-freeze liquid, the pressure in the radiators must be momentarily raised to produce this result. This is accomplished by actuating the solenoid valve 44 to close the radiator pipe behind meter 41. The valves 38 are also closed. The small pump is then operated briefly, this pump being just for the purpose of applying the required pressure independently of the rest of the system. This operation is performed by central switching apparatus 45 operating through control lines 46, 47 and 48.

The actual amount of anti-freeze liquid to be exuded is comparatively slight since heat is already assisting in anti-icing the wing surface. The porosity of the sintered metal surface may be of a fine order so that the surface is smooth and the amount of liquid exuded under ordinary conditions is negligible.

In regard to the heater 6, this may be of the fuel combustion type since the fuel consumption is low due to the fact that the heat is required only for regulating the temperature of the liquid and not for supplying the total heat requirements of any function of the plane. In this case, the control 28 would start and stop the burner or regulate fuel consumption. Similarly if an exhaust gas exchange is used for this purpose, it need not be large because the engine itself supplies the main heating requirements.

In aircraft designed for long distance flights and where fuel consumption must be limited, the system illustrated in Fig. 2 may be used for the heater. Here a part of the hot exhaust gas in pipe 49 is diverted into the core 50 of the exchanger portion through which the liquid passes by means of the pipes 51. This is used ordinarily under icing conditions in the same manner as has been previously described in connection with the heater 6, the hot gas being admitted as the port or valve 52 is opened. However in case of engine failure or where it is desired to warm a still engine, a supplementary combustion heater 53 is operated and the hot gas therefrom is admitted into the chamber 54 to heat the core in lieu of the exhaust gas. The valve 55 which admits the combustion gases is closed when the exhaust gas valve is open and vice versa. The valve 12 which controls the flow of liquid to the cabin heat exchanger 10 may then be partly or fully closed to conserve fuel or heat for this process when necessary.

In large transport planes where cabin heating requirements are high, the heat exchanger may be of a type which uses the full flow of the exhaust gas.

I claim:

1. In an aircraft, the combination of an engine, a wing radiator, means for circulating a liquid coolant, said liquid being partly heated by the engine cooling jacket and means for heating said liquid supplemental to said engine cooling jacket and means for varying the amount of supplemental heat added to said liquid independently of the heat imparted to said liquid by the cooling jacket.

2. In an aircraft, the combination of an engine, a wing radiator, means for circulating a liquid coolant, said liquid being heated by the engine cooling jacket and means for heating said liquid supplemental to said cooling jacket and means for varying the amount of supplemental heat added to the liquid independently of the heat imparted to the liquid by the cooling jacket whereby the temperature of the liquid is maintained within a normal operating range under excessive cooling conditions.

3. In an aircraft, the combination of an engine, a wing radiator, means for circulating a liquid coolant, said liquid being heated by the engine cooling jacket, means for heating said liquid supplemental to said cooling jacket and means for increasing the flow of liquid through the radiator under icing conditions and means for increasing the amount of supplemental heat added to the liquid accordingly whereby the coolant temperature is maintained under the increased flow.

4. In an aircraft, the combination of an engine, a wing radiator, means for circulating a liquid coolant, said liquid being heated by the engine cooling jacket, and an exhaust gas heat exchanger for heating the liquid supplemental to the engine cooling jacket, and means for varying the amount of supplemental heat added to the liquid independently of the heat imparted by the cooling jacket.

5. In an aircraft, the combination of an engine, a wing radiator, means for circulating a liquid coolant, said liquid being heated by the engine cooling jacket, an independent fuel combustion heater for heating the liquid supplemental to the cooling jacket, and means for varying the supplemental heat imparted to the liquid thereby for maintaining the coolant temperature under varying atmospheric effect on the wing radiator.

6. In an aircraft, the combination of an engine, a wing radiator, means for circulating a liquid coolant, said liquid being partly heated by the engine cooling jacket, means comprising a heat exchanger for heating the liquid supplemental to the engine surface an independent fuel combustion heater and means for leading exhaust gas through the heat exchanger and means to lead combustion heater gas through said exchanger whereby either gas may heat the same.

7. In an aircraft, the combination of an engine, a radiator therefor for heating the ice accumulating portion of the aircraft, means for circulating a liquid coolant, a pipe line by-passing the radiator with automatic means to decrease the flow through the radiator when the temperature of the liquid falls and means operable at will under icing conditions for reversing the effect of the latter means whereby the flow of the liquid increases with falling temperature of the same.

8. In an aircraft, the combination of an engine, a wing radiator, means for circulating a liquid coolant through the wing radiator and through the cooling jacket of the engine, means for automatically controlling the flow of the liquid through the radiator according to ambient temperature and independent means for varying at will the flow through the radiator to increase said flow under icing conditions.

9. In an aircraft, the combination of an engine, a wing radiator, means for circulating a liquid coolant through the radiator and through the cooling jacket of the engine whereby the temperature of the radiator is maintained above the ambient for engine heat dissipation and independent means for raising the temperature of the liquid passing through the radiator under icing conditions above the point which would otherwise normally prevail for preventing ice formation.

10. In an aircraft, an engine warming system having in combination an engine, a radiator, a coolant pump therefor, means for heating the coolant supplemental to the cooling jacket of said engine, means for driving the coolant pump independently of the engine in conjunction with the operation of the supplemental heating means whereby the engine is heated while at rest.

11. In an aircraft, the combination of an engine, a radiator, means for circulating a liquid coolant, said liquid being heated by the engine cooling jacket, means for heating the liquid supplemental to said engine cooling jacket, means for varying the amount of supplemental heat in accordance with the temperature of the liquid, a pipe line diverting a portion of said liquid, an air-liquid exchanger in said pipe line, means for passing the liquid therethrough and means coacting with said exchanger for heating the cabin of the aircraft.

12. In an aircraft, the combination of an engine, a wing radiator, means for circulating a liquid coolant through the engine cooling jacket and the wing radiator whereby the temperature of the wing radiator is raised above the ambient atmospheric temperature to dissipate engine heat, means for regulating the liquid flow through the wing radiator to vary its temperature in accordance with variation in atmospheric temperature and independent means operable at need under icing conditions for increasing the flow of liquid through the radiator above that ordinarily provided by the regulating means whereby the temperature of the radiator is raised for preventing ice formation.

LEON DEWAN.